United States Patent [19]
Bartels et al.

[11] 3,739,428
[45] June 19, 1973

[54] SKINNING MACHINE FOR FISH FILLETS

[75] Inventors: Alfred Bartels, Lubeck-Israelsdorf; Jürgen Drews; Günther Pinkerneil, both of Lubeck, all of Germany

[73] Assignee: Nordischer Maschienbau Rnd. Baader, Lubeck, Germany

[22] Filed: June 21, 1971

[21] Appl. No.: 155,191

[52] U.S. Cl. .................................................. 17/62
[51] Int. Cl. ............................................. A22c 25/17
[58] Field of Search .................... 17/62, 54, 61, 50

[56] References Cited
UNITED STATES PATENTS

| | | | |
|---|---|---|---|
| 3,529,318 | 9/1970 | Jobmann................................ | 17/62 |
| 2,215,114 | 9/1940 | Baader et al........................... | 17/54 |
| 2,806,245 | 9/1957 | Bartels.................................... | 17/62 |

FOREIGN PATENTS OR APPLICATIONS

| | | | |
|---|---|---|---|
| 1,454,077 | 3/1969 | Germany................................ | 17/62 |
| 683,867 | 12/1952 | Great Britain......................... | 17/62 |

*Primary Examiner*—Lucie H. Laudenslager
*Attorney*—V. Alexander Scher

[57] ABSTRACT

A skinning machine for fish fillets, particularly fish fillets of flat fish including a power driven skinning roller, an oscillating skinning knife arranged in parallel relation to the axis of the skinning roller and a pressure pad arranged below the skinning knife and extending in spaced relation along the circumference of the skinning roller forming a passage for the skin of the fish fillet. The skinning knife is pivotally supported on a shaft extending in parallel spaced relation to the axis of the skinning roller. In its position of rest the cutting edge is kept in adjustable spaced relation to the circumference of the skinning roller within a range of five to 10 times the thickness of the skin of the fish fillet. The skinning knife is coupled with means shiftable by the resistance experienced in the drive of the skinning roller when initiating the skinning process, whereby the cutting edge of the skinning knife is moved toward the circumference of the skinning roller into its cutting position wherein it is spaced from the circumference of the skinning roller a distance corresponding to the thickness of the skin of the fish fillet.

3 Claims, 1 Drawing Figure

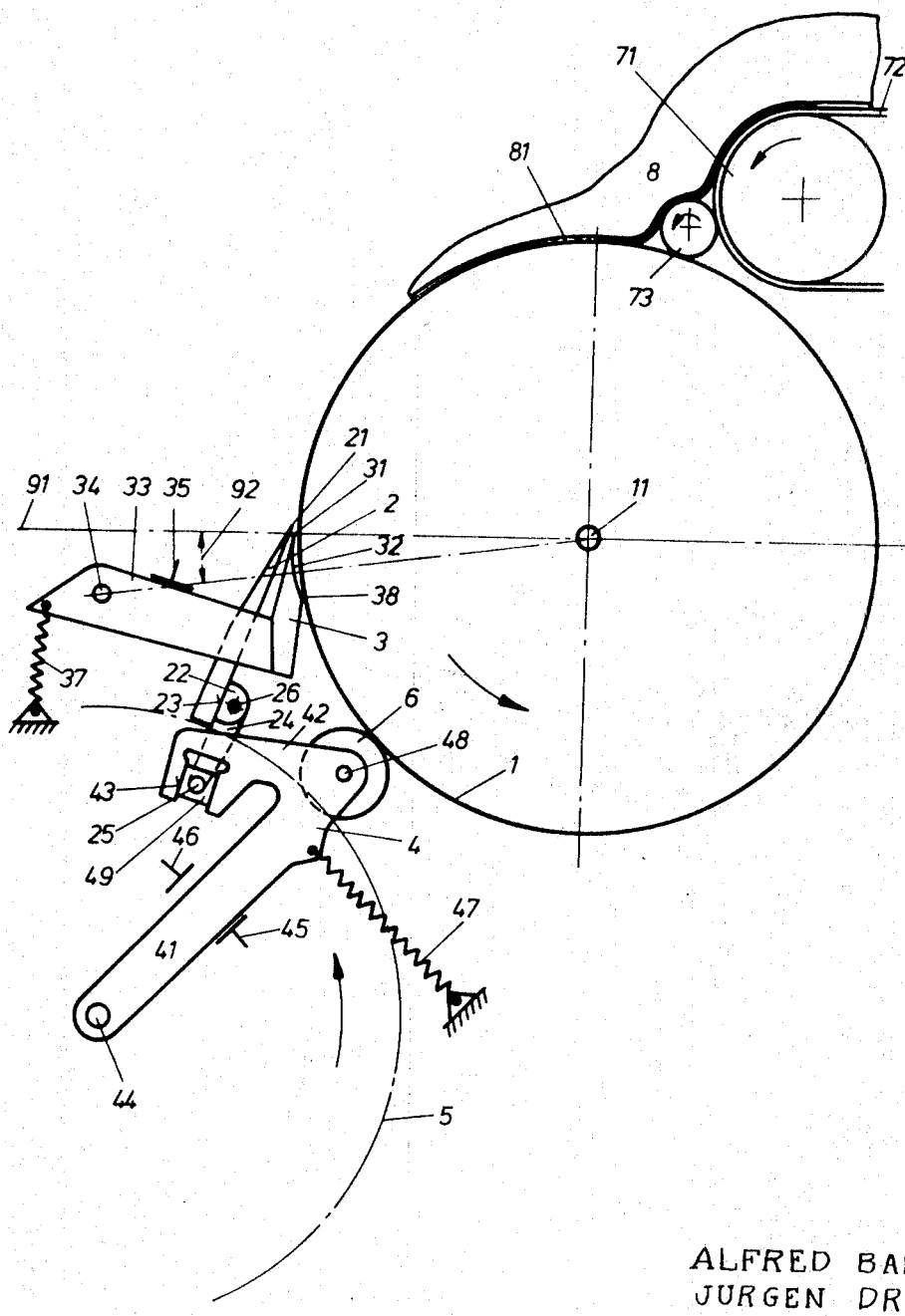

SKINNING MACHINE FOR FISH FILLETS

BACKGROUND OF THE INVENTION

1. Field of Invention

Skinning machines for fish fillets are used in the fish industry and serve to prepare the flesh of fish for marketing. After the flesh of the fish has been removed from the bones the socalled fish fillets must be skinned, i.e., the outer skin layer must be removed leaving the silvery subcutaneous tissue on the fillet.

2. Description of the Prior Art

A skinning machine for fish fillets has, for example, been disclosed in the U.S. Pat. No. 3,529,318 to Paul Jobmann, issued Sept. 22, 1970, which comprises a pair of rollers, namely a skinning roller and a pressure roller, both having roughened surfaces of differing diameters, rotating in opposite directions, and an oscillating skinning knife arranged behind the rollers with respect to the direction of rotation. The cutting edge of the skinning knife is spaced a fixed distance from the circumference of the skinning roller having the greater diameter, and is disposed at the narrowest point between the skinning roller and the pressure roller. A pressure pad is arranged below the skinning knife in fixed relation to the skinning roller forming a gap with its circumference serving as passage for the skin. This known machine allows fish fillets to be skinned without initial cutting losses of flesh, while the silvery subcutaneous tissue is left on the fillet. However, this machine is unsuitable for skinning fish fillets which have been cut bluntly at the root of the tail, or such derived from flat fish which, as is well known, have a thicker skin. A proper feed-in of the skin below the skinning roller is not possible in this case.

Therefore, the main object of this invention is to be seen in the provision of a skinning machine for fish fillet which is particularly adapted for skinning fillets derived from flat fishes and others having a non-tapering blunt cutting edge.

Another object of the invention is to provide a skinning machine in which the skinning knife is supported for radially pivotal and longitudinally oscillating movements relative to the axis of the skinning roller wherein the position of rest is defined by adjustable stop means in which the space between the cutting edge of the skinning knife and the circumference of the skinning roller amounts to five to ten times the thickness of the skin of the fish fillet.

Another object of this invention is to provide a skinning machine in which a pressure pad is arranged below the skinning knife forming with the circumference of the skinning roller a passage gap for the skin of the fish fillet.

Still another object of this invention is to provide a skinning machine including means for moving the cutting edge of the skinning knife into its cutting position in response to the rotational resistance of the skinning roller, when the skinning process is initiated.

According to the present invention the skinning machine for fish fillet, particularly such of flat fish, for example plaice, comprises in combination a power driven skinning roller having a roughened circumferential surface;

a skinning knife supported for pivotal and longitudinally oscillating movements on a shaft extending in parallel relation to the axis of the skinning roller and urged by spring means against adjustable stop means defining the position of rest in which its cutting edge is spaced from the circumference of the skinning roller a distance amounting to five to 10 times the thickness of the skin of the fish fillet;

a pressure pad arranged below the skinning knife in a normally fixed spaced relation to the circumference of the skinning roller, thereby forming a passage gap for the severed skin of the fish fillet between the circumference of the skinning roller and its surface opposed thereto;

shifting means operatively coupled with the skinning knife pivoting the skinning knife toward the circumference of the skinning roller in response to the increased resistance against rotation of the skinning roller when the cutting process is initiated thereby moving the cutting edge of the skinning knife into its cutting position spaced from the circumference of the skinning roller a distance corresponding to the thickness of the skin.

Preferably the pressure pad is formed, in a known manner, with a concave pressure surface corresponding substantially to the curvature of the skinning roller having a feed-in edge spaced a greater distance from the circumference of the skinning roller than its exit edge.

Advantageously the pressure pad is supported at a point disposed on the leg of an angle in the range of 15° opening outwardly in the direction of rotation from the center of the skinning roller, the other leg of the angle passing through the feed-in edge of the pressure pad.

According to the invention, the pressure pad is preferably fixed to the free end of a pair of lever arms arranged to pivot about the support point formed by the axis of a shaft extending in parallel relation to the axis of the skinning roller, the pair of lever arms being urged by spring means against a stop defining the uppermost position of the pressure pad in which the one leg of the angle intersects its feed-in edge.

The preferred embodiment of the invention provides that the shifting means is formed by a known per se rocker arm pivotal against the force of a spring between a fixed and an adjustable stop and carrying a wheel disposed in the drive of the skinning roller.

BRIEF DESCRIPTION OF THE DRAWING

The single FIGURE of the drawing shows an exemplified embodiment of the skinning machine according to the invention in a schematic manner, wherein for reasons of clarity the machine frame, the drive, and the gearing have been omitted.

DESCRIPTION OF THE PREFERRED EMBODIMENT

In the drawing there is shown a driven skinning roller 1 rotating about an axis 11 in the direction indicated by the arrow. A belt conveyor 71 including a feed belt 72 for the fish fillets is arranged above the skinning roller 1. A driven transfer roller 73 is disposed in the throat formed between the feed belt 72 and the skinning roller 1. A fed fish fillet 8 rests with its skin 81 on the skinning roller 1, the transfer roller 73, and the feed belt 72. A pressure pad 3 including a concave pressure surface 32 is pivotally supported by a pair of support arms 33 on a stationary axis 34 and urged by a spring 37 against a stop 35. The stationary axis 34 is offset from the horizontal 91 at an acute angle as indicated by 92. The distance between the exit edge 38 of the pressure pad 3 and the circumference of the skinning roller 1 is less than the thickness of the skin of the smallest fish fillet to be skinned, while the distance at the feed-in edge 31 is substantially twice as great. A skinning knife 2 is arranged above the pressure pad 3. The cutting edge 21 of the skinning knife 2 is disposed closely adjacent the feed-in edge 31 of the pressure pad 3. The skinning knife 2 is mounted at the end of a knife support 22 which is journalled to pivot about an axis 26, and is provided with a crank arm 24 carrying by means of a pin 25 a sliding member 49 guided in a coulisse 43 of a shifting lever 4 journalled to pivot about an axis 44 extending in parallel relation to the axis of the skinning roller. The shifting lever 4 consists of an arm 41 carrying a freely rotatable gear at its free end, and a cantilever arm 42 carrying the sliding member 49 of the coulisse 43. The shifting lever 4 is constantly urged by a spring 47 against a stationary stop 45, while an adjustable stop 46 is provided limiting the pivotal movement. The gear 6 which is rotatably supported by a pin 48 meshes with a gear rotating in unison with and having the same diameter like the skinning roller 1 and a drive gear 5 rotating in the same direction as the skinning roller 1.

OPERATION OF THE SKINNING MACHINE

The fish fillet 8 fed by the feed belt via the transfer roller 73 to the skinning roller 1 rests with its skin side on the circumferential surface of the skinning roller 1 and is moved toward and past the skinning knife 2. The cutting edge 21 of the skinning knife penetrates closely above the skin into the fish fillet 8 and the cut-off tip of the skin gets into the gap formed between the concave pressure surface 32 of the pressure pad 3 and the circumferential surface of the skinning roller 1 and is urged against the skinning roller 1 which, due to its knurled, or otherwise roughened, surface will take it along. The friction developed by the skin 81 along the pressure pad 3 causes an increase of the drive resistance of the skinning roller 1, whereby the intermediate gear 6 is displaced in the direction of rotation of the drive gear 5 causing pivoting movement of the shifting lever 4 in a counterclockwise direction, so that the skinning process is practically achieved without any loss of flesh. After the tip of skin has passed the pressure pad 3 the drive resistance of the skinning roller 1 decreases allowing the intermediate gear 6 together with the shifting lever 4 to return to their initial positions. The degree of the pivoting movements of these members, i.e., the movement between the initial position and the end position, may be adjusted by the settings of the stops 45 and 46.

The pressure pad 3 is supported by a pair of lever arms 33 for pivotal motion about the axis 34 and is urged by springs 37 against the stop 35. By means of this construction it is possible that the pressure pad 3 may move a limited amount in case of local resistance without changing the width of the gap between the pressure surface 32 and the circumferential surface of skinning roller 1 substantially.

The setting of the skinning knife 2 to a distance between its cutting edge 21 and the circumferential surface of the skinning roller 1 to about five to ten times of the thickness of the skin 81 of the fish fillet 8 corresponds approximately to 0.5 to 2 mm as compared with a distance between 6 to 15 mm in customary skinning machines for fish fillets having skinning knives moved into operating positions by the drive resistance. Thus skinning is made possible with practically no loss of flesh when the skinning is initiated.

What is claimed is:

1. A skinning machine for fish fillets, particularly those of flat fish, comprising in combination, a power driven skinning roller having a roughened circumferential surface, a skinning knife having a cutting edge, a shaft extending parallel to the axis of said roller and supporting said knife for pivotal and longitudinally oscillating movements, stop means connected with said shaft for maintaining the cutting edge of said knife in a position of rest in which it is spaced from the circumference of said roller a distance amounting to five to 10 times the thickness of the skin of the fillet being skinned, a pressure pad located in a normally fixed spaced relation to the circumference of said roller below said skinning knife and having a concave pressure surface corresponding substantially to the curvature of said roller, a feed-in edge being spaced at a greater distance from the circumference of said roller than said exit edge, whereby a passage gap is formed for the severed skin of the fish fillet between the circumference of said roller and said concave pressure surface, and shifting means connected with the first-mentioned means for pivoting said skinning knife toward the circumference of said roller in response to increased resistance against rotation of said roller when the cutting is initiated and thereby moving said cutting edge into a cutting position spaced from the circumference of said roller a distance corresponding the the thickness of the skin of the fillet being skinned.

2. A skinning machine according to claim 1, comprising two interconnected lever arms, one of said arms having a free end, said pressure pad being fixed to said free end, a shaft pivotally supporting said lever arms and extending parallel to the axis of said skinning roller, a stop adapted to engage one of said arms in a position defining the uppermost position of said pressure pad, and spring means connected with said one arm and pressing it against said stop.

3. A skinning machine according to claim 2, wherein said spring means press said pressure pad in the direction of a radius extending from the axis of said skinning roller substantially through the center of its concave pressure surface.

* * * * *